J. P. BECKER.
DIRECTION INDICATOR.
APPLICATION FILED AUG. 6, 1919.
1,341,352.
Patented May 25, 1920.
2 SHEETS—SHEET 2.
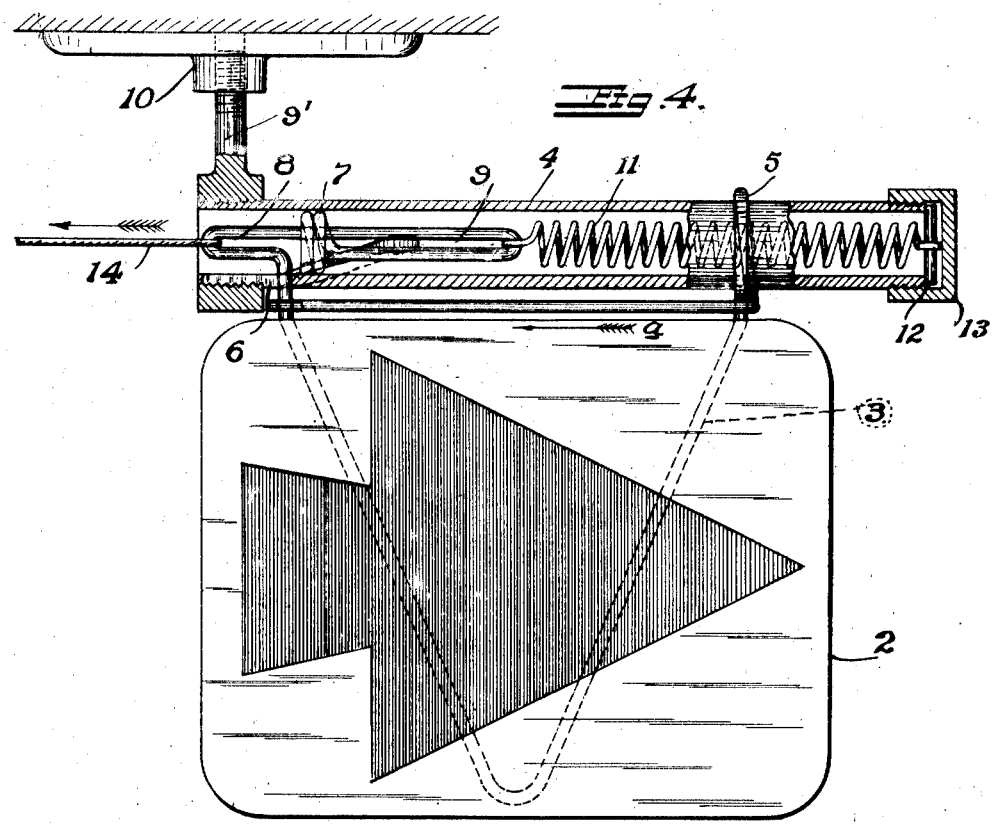
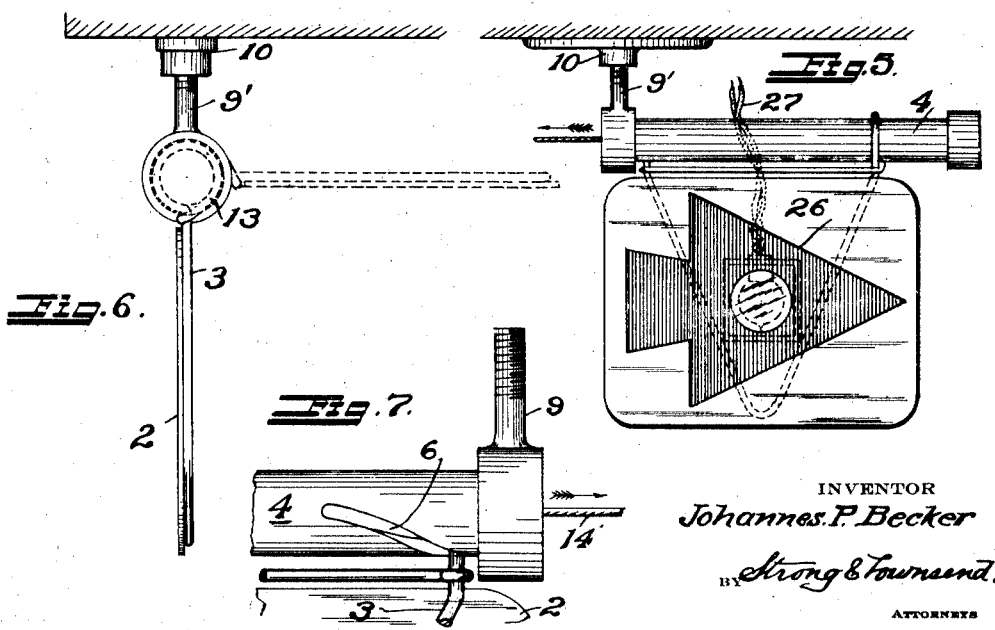
INVENTOR
Johannes P. Becker
BY Strong & Townsend
ATTORNEYS

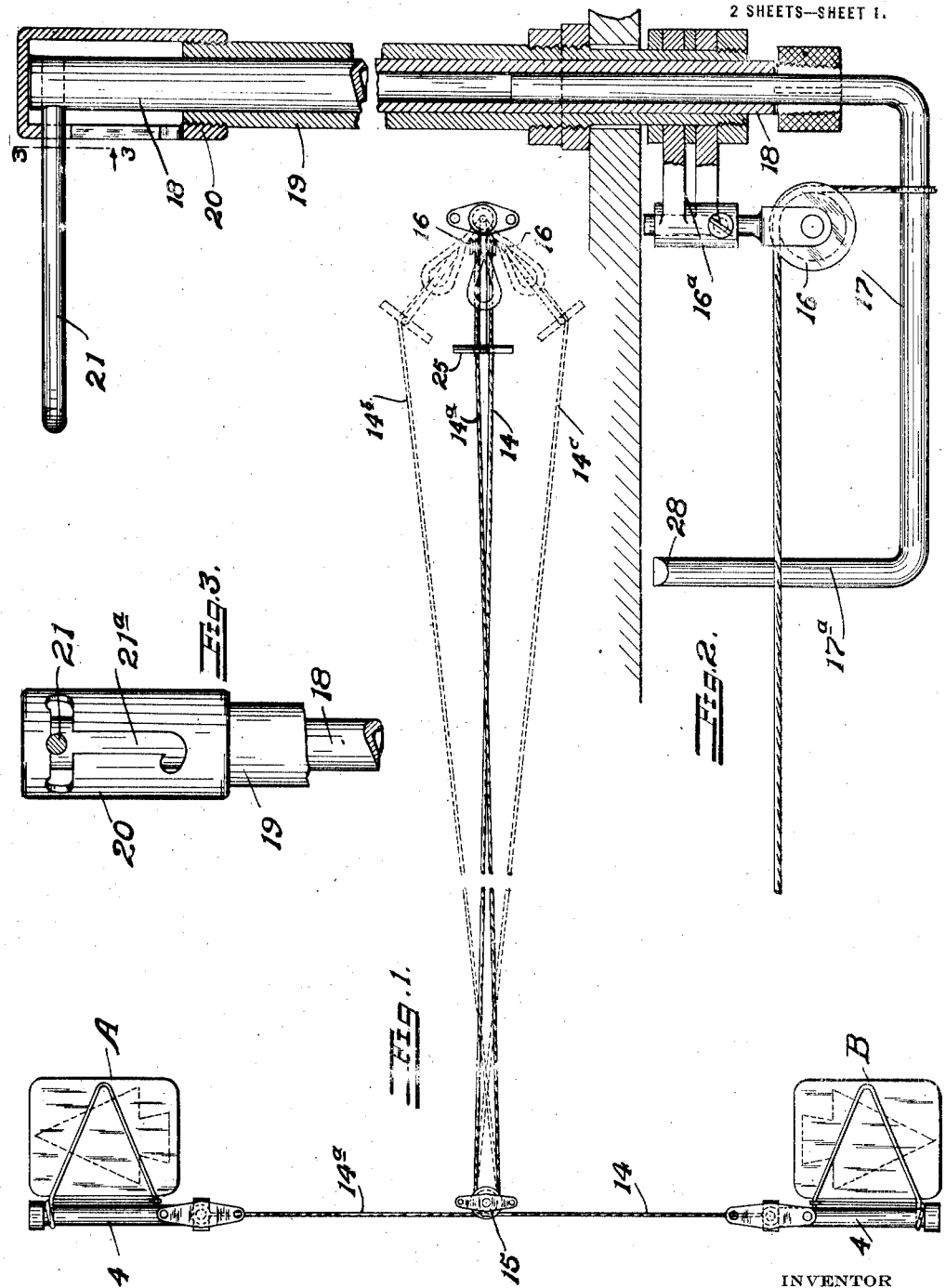

UNITED STATES PATENT OFFICE.

JOHANNES PAUL BECKER, OF BERKELEY, CALIFORNIA.

DIRECTION-INDICATOR.

1,341,352.     Specification of Letters Patent.     Patented May 25, 1920.

Application filed August 6, 1919. Serial No. 315,660.

*To all whom it may concern:*

Be it known that I, JOHANNES P. BECKER, a citizen of the United States, residing at Berkeley, in the county of Alameda and State of California, have invented new and useful Improvements in Direction-Indicators, of which the following is a specification.

This invention relates to a direction indicator for motor vehicles and the like and particularly to a manually operated mechanism for displaying the signals required.

One of the objects of the present invention is to provide a simple, substantial and easily operated direction indicator which is particularly designed for daylight service and use on heavy automobile trucks and the like as they are seldom employed except during certain hours of the day. Another object of the invention is to provide a direction indicator or signaling device which is adapted to be attached to the rear end of a truck and which is capable of indicating whether the truck is going to turn to the right or left or stop.

Another object of the invention is to provide means adapted to be placed within convenient reach of the driver, whereby the direction indicator may be easily and quickly operated.

Further objects will hereinafter appear.

The invention consists of the parts and the construction, combination and arrangement of parts as hereinafter more fully described and claimed, having reference to the accompanying drawings, in which—

Figure 1 is a plan view of the direction indicator and the mechanism employed in conjunction therewith.

Fig. 2 is a central, vertical section of the hand lever and the mechanism connected therewith.

Fig. 3 is a detail view of the upper end of the post in which the hand lever is turnably and slidably mounted.

Fig. 4 is a detail sectional view of one of the direction indicators.

Fig. 5 is a similar view in side elevation.

Fig. 6 is an end view of Fig. 5.

Fig. 7 is a detail view of one end of the tube by which one of the direction indicators is supported, said view showing the spiral slot by which turning movement is transmitted to the indicating means.

Referring to the drawings in detail and particularly to Fig. 1, it will be seen that two direction indicators are employed, as indicated at A and B, the indicator shown at A being employed when it is desired to turn to the left and the indicator at B when it is desired to turn to the right, or both indicators being employed if it is desired to stop. The indicators are preferably mounted on the rear end of a truck or other vehicle upon which they are employed and are normally held in a position where they are not visible. The direction indicators A and B are identical in construction and I will therefore only describe the construction of one.

By referring to Fig. 4, it will be seen that the direction indicator consists of a flag-like member 2 which is supported by a V-shaped wire bail indicated by dotted lines at 3. One end of the bail is looped about a tube 4, as indicated at 5, and forms a pivotal or hinge-like mounting for the flags 2. The opposite end of the bail projects through a spiral-shaped slot 6 formed in the tube, said slot being particularly shown in Fig. 7. The bail, after entering the tube is then bent to form a central coil 7 and a pair of loops 8 and 9, the coil 7 being merely formed to centrally support the loop-like terminals 8 and 9 within the tube and to form a bearing therefor which will coöperate with the loop 5 to permit turning movement of the flag and bail with relation to the tube. The tube proper is secured by a bracket 9 to the rear end of the car by means of a plate 10. Mounted interior of the tube is a coil spring 11, one end of which is fastened to a pin 12 which is inclosed by a cap 13 while the opposite end of the spring is secured to the loop 9. The function of the spring will hereinafter be described. Connected to the loop 8 is a flexible wire cable 14 which passes over a directing pulley 15 (see Fig. 1). The opposite end of the cable then passes over a guide pulley 16 and is finally secured to an arm 17, which may be turned to the right or the left or depressed; this arm is keyed or otherwise secured in a sleeve-like member 18 which is turnably mounted within a tube or standard 19. This standard is placed within convenient reach of the driver and the upper end of the standard is inclosed by a cap 20 in which is formed a T-shaped slot (see Fig. 3). Extending through the T-shaped slot is a hand lever 21, which may be turned to the right or the left in the upper part of the T-shaped slot or depressed by merely pulling it downward into the leg of the T-shaped slot.

The hand lever 21 is secured in the upper end of the sleeve 18 and it is therefore capable of turning the sleeve and the crank arm 17 secured thereto or of raising or lowering the sleeve and the crank arm secured thereto.

There are, as previously stated, two direction indicators as indicated at A and B, and as these are identical in construction and operation, it is obvious that two cables are necessarily employed, one indicated at 14 and one at 14$^a$. The cables 14 and 14$^a$ pass over identical guide sheaves 15 but they pass over separate sheaves 16; that is, two sheaves 16 are employed but they are placed side by side, as shown in Fig. 1, the sheaves 16 being supported by a bracket 16$^a$, which in turn is secured to the lower end of the main tube or standard 19.

The operation of the device will be as follows: If it is desired to turn to the left, it is only necessary for the driver to turn the hand lever 21 to the left in the upper end of the T-shaped slot. This movement is, of course, transmitted to the sleeve 18 and the crank arm 17, causing the sleeve and crank arm to also turn to the left. Formed on the forward end of the crank arm 17 is an upwardly projecting extension 17$^a$ which passes between the cables 14 and 14$^a$. This upward extension will, during its turning movement, engage the cable 14$^a$ and pull it into the dotted line position shown at 14$^b$ (see Fig. 1). A pull is therefore exerted on the cable 14, which will move the bail 3 as a whole, lengthwise of the tube supporting the same. Lengthwise movement of the bail on the tube will cause a turning movement of the bail and the flag supported thereby, as one end of the bail extends through the spiral slot 6, the extent of movement of the bail upon the tube being shown in Fig. 4. That is, engagement of the bail with the upper end of the spiral-shaped slot 6 permits the flag to assume a horizontal position while lengthwise movement of the bail upon the tube to the lower end of the slot permits the slot to transmit a turning movement to the bail, which will cause the flag to assume a vertical position, as shown in Fig. 4.

Release of the hand lever 21 or movement of the hand lever to the central position shown in Fig. 3 permits the cable and the bail to return to normal position, this movement being automatically taken care of by the coil spring 11, as the coil spring 11 is placed under tension when the bail is moved in the direction of arrow $a$ and this tension is sufficient to pull the bail back into normal position when the pull on the cable is released, by returning the hand lever, sleeve 18, crank arm 17 and extension 17$^a$, to normal position.

If it is desired to turn to the right, it is only necessary to move the hand lever to the right. This movement is transmitted in a similar manner to exert a pull on the cable 14, which will move it into the dotted line position shown at 14$^c$. The pull exerted by the movement of the cable will operate the flag B to the extent that it will swing it from the horizontal invisible position to the vertical or depressed position shown in Figs. 4 or 5. Means are therefore provided for indicating whether the vehicle is going to turn to the right or to the left. The same means are also employed if it is desired to stop; that is, both flags A and B are then displayed in unison. This is accomplished by depressing the hand lever 21 or pulling it downwardly in the vertical leg of the slot, indicated at 21$^a$ (see Fig. 3). This downward movement is obviously transmitted to the sleeve 18 and the crank arm 17 and is in turn transmitted to the cables so that a pull is exerted on the same, this being due to the fact that the cable ends are secured to the crank arm, as shown at 34. The crank arm will therefore exert a pull on both cables which is sufficient to lower or depress the flags A and B, thereby indicating that the vehicle is going to stop.

By referring to Figs. 1 and 2 it will be seen that the upward extension 17$^a$ of the crank arm 17 is provided with a cross bar 25. This is always disposed above the cables and thereby serves as a guard which prevents the cables from being tangled or accidentally jumping from one side to another of the upward extension 17$^a$. The flags are in all instances automatically returned to the normal position which is horizontal, when the hand lever is returned as the coil springs 11 connected therewith have sufficient tension to return the flags to normal position.

The present invention is particularly designed for heavy auto trucks and the like, which are, as a rule, only employed for daylight traffic. I, however, wish it understood that the device may be used for night driving if desired, by merely placing a light such as shown at 26, on each flag, said lights being connected by a flexible cord 27, which permits free movement of each individual flag and also permits connection with a suitable source of current supply. The device may therefore be used for night driving if desired but will, under ordinary circumstances, only serve for day driving.

From the foregoing it can be seen that I have provided a simple and substantial mechanism which may be applied to practically any form of truck or vehicle desired; further, a mechanism which is simple and substantial in construction and which consists of so few parts that reliable operation may be assured. Also, that I have provided a mechanism which is manually operated by a hand lever placed within convenient reach of the driver and therefore easy to operate.

While a more or less specific structure is here shown, I wish it understood that changes in design and proportions may be resorted to within the scope of the appended claims; similarly, that the materials and finish of the several parts employed may be such as the experience and judgment of the manufacturer may dictate or varying conditions may demand.

Having thus described my invention, what I claim and desire to secure by Letters Patent is—

1. In a vehicle direction indicator of the character described, tubular shafts horizontally and transversely mounted at each side of the vehicle rear and having spiral slots made in said shafts, triangular bails having one end turnably clasping the tubes and the other ends bent to enter the spiral slots, flag-like indicators carried by the bails and turnable therewith by the action of the spiral slots to present to view either a flat face or an edge view of the flags, connections by which the bails may be moved in one direction to cause the spiral slots to turn them, and a return spring connected with the inclosed ends of the bail.

2. In a vehicle direction indicator, transversely mounted tubular members each having a bail, one end of which turnably clasps a tube, spiral slots into which the opposite end of the bail enters and forms loops within the tube, a flexible connection with one of said loops, manual means to act through said connection to advance the bail, a coil spring connected with the opposite loop to return the bail, and flag-like indicators mounted upon and movable with the bails to expose a face or an edge view.

3. The combination with the rear end of a vehicle, of a pair of direction indicators, disposed one on each side thereof, a tubular support for each indicator, means permitting turning movement of each indicator with relation to its tubular support, means in each tubular support for normally maintaining each indicator in a horizontal non-displaying position, and manually operated means for turning either indicator into vertical displaying position independent of the other, or for moving both indicators in unison into vertical displaying position.

4. The combination with the rear end of a vehicle, of a pair of direction indicators, disposed one on each side thereof, a support for each indicator about which they are turnably mounted, manually operated means on the vehicle for turning either indicator into a vertical displaying position independent of the other or for turning both in unison into vertical displaying position, and means on each support operable independent of said manually operated means for automatically returning both or either indicator into horizontal non-displaying position.

5. In a direction indicator a pair of indicating flags, a cable attached to each flag for turning the same into display position, a rod to which both cables are connected, means for exerting a pull on both cables to turn both flags into display position by vertical movement of the rod, and means actuated by turning movement of the rod for exerting a pull on one cable or the other to display one flag or the other.

6. A direction indicator for vehicles and the like, comprising a tubular support, a bail-shaped member turnably mounted on the support, a flag-like indicator carried by the bail member, a spiral-shaped slot formed in the tube, a projecting arm on the bail entering the tube through the spiral-shaped slot, a spring attached to one end of said projection, a cord attached to the opposite end of said projection, said spring adapted to normally exert a pull which will maintain the bail and the flag carried thereby in a horizontal non-displaying position, and manually actuated means for exerting an end-wise pull on the cord to move the bail and flag longitudinally on the tube and thereby permit a turning movement to be imparted thereto by the spiral-shaped slot.

7. A direction indicator for vehicles and the like, comprising a tubular support, a bail-shaped member turnably mounted on the support, a flag-like indicator carried by the bail member, a spiral-shaped slot formed in the tube, a projecting arm on the bail entering the tube through the spiral-shaped slot, a spring attached to one end of said projection, a cord attached to the opposite end of said projection, said spring adapted to normally exert a pull which will maintain the bail and the flag carried thereby in a horizontal non-displaying position, manually actuated means for exerting an end-wise pull on the cord to move the bail and flag longitudinally on the tube and thereby permit a turning movement to be imparted thereto by the spiral-shaped slot, said manually operated means comprising a hand lever, a crank arm turnable by means of said hand lever, and a projection on said hand lever adapted to depress the cord or to move the same to either side and thereby exert a pull on the cord in either instance.

8. The combination with the rear end of a vehicle, of a pair of direction indicators disposed one on each side thereof, each indicator comprising a tubular support, a bail-shaped member turnably mounted on each support, a flag-like indicator carried by each bail, a spiral-shaped slot formed in each tubular support, a projecting arm on each bail member projecting through each slot, a coil spring in each tube attached to each arm, a cord for each arm, a crank arm passing between the cords, a sleeve to which said crank arm is secured, a hand lever on the sleeve, a cap inclosing the upper end of the sleeve and the hand lever, a T-shaped slot formed in each cap through which the hand lever projects, and a projection on the crank arm engageable with both cords.

9. In a direction indicator a pair of indicating flags, a cable attached to each flag for turning the same into display position, a rod to which both cables are connected, manually actuated means for imparting a turning movement to the rod and a vertical movement, and a crank arm on the rod adapted to exert a pull on either cable when the rod is turned, said crank arm adapted to exert a pull on both cables when the rod is moved vertically.

10. In a direction indicator a pair of indicating members, a cable attached to each member for turning the same into display position, a rod to which both cables are connected, means for transmitting a vertical turning movement to the rod, means actuated by vertical movement for exerting a pull on both cables, means actuated by turning movement of the rod for exerting a pull on either cable, and means operable independent of the rod and the cables for normally maintaining the display members in non-displaying position.

11. In a direction indicator a pair of indicating members, a cable attached to each member for turning the same into displaying position, a rod, means for imparting vertical and a turning movement thereto, a crank arm on the rod to which both cables are attached, said crank arm adapted to exert a pull on both cables when vertical movement is imparted to the rod, a vertical projection on the crank arm passing upwardly between the cables, said vertical projection adapted to exert a pull on either cable when turning movement is imparted to the rod and the crank arm.

12. In a direction indicator a pair of indicating members, a tubular support for each member on which they are turnably mounted either to assume a horizontal position or a vertical display position, manually actuated means for turning both or either indicating member into display position, and means direct connected with each indicating member for normally maintaining the same in horizontal non-displaying position.

In testimony whereof I have hereunto set my hand in the presence of two subscribing witnesses.

JOHANNES PAUL BECKER.

Witnesses:
 JOHN H. HERRING,
 W. W. HEALEY.